(12) United States Patent
Ramirez Corredores et al.

(10) Patent No.: US 8,377,152 B2
(45) Date of Patent: **\*Feb. 19, 2013**

(54) PRODUCTION OF RENEWABLE BIO-DISTILLATE

(75) Inventors: Maria Magdalena Ramirez Corredores, Houston, TX (US); Jennifer Sorrells, Houston, TX (US); Changan Zhang, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/915,872

(22) Filed: Oct. 29, 2010

(65) Prior Publication Data

US 2012/0017492 A1 Jan. 26, 2012

(51) Int. Cl.
*C10L 1/182* (2006.01)
*C10L 1/16* (2006.01)

(52) U.S. Cl. ................ 44/450; 44/605; 585/14

(58) Field of Classification Search .......... 44/450, 44/605, 329, 350, 436, 438, 446, 447, 448; 585/3, 14

See application file for complete search history.

(56) References Cited

U.S. PATENT DOCUMENTS

| | | | |
|---|---|---|---|
| 4,209,647 A | 6/1980 | Gallivan et al. | |
| 4,645,585 A | 2/1987 | White | |
| 5,820,640 A | 10/1998 | Ikura et al. | |
| 6,172,272 B1 * | 1/2001 | Shabtai et al. | 585/242 |
| 7,262,331 B2 | 8/2007 | Van de Beld et al. | |
| 7,279,018 B2 * | 10/2007 | Jakkula et al. | 44/301 |
| 7,311,739 B2 | 12/2007 | Bongart et al. | |
| 7,425,657 B1 | 9/2008 | Elliott et al. | |
| 7,638,314 B2 | 12/2009 | Zappi et al. | |
| 2007/0260102 A1 * | 11/2007 | Santiago et al. | 585/733 |
| 2007/0261296 A1 | 11/2007 | Adams et al. | |
| 2008/0006520 A1 | 1/2008 | Badger et al. | |
| 2008/0172931 A1 * | 7/2008 | Bazzani et al. | 44/447 |
| 2008/0300434 A1 * | 12/2008 | Cortright et al. | 585/1 |
| 2008/0312476 A1 | 12/2008 | McCall | |
| 2009/0065378 A1 | 3/2009 | Maas | |
| 2009/0166256 A1 | 7/2009 | Lewis et al. | |
| 2009/0227823 A1 | 9/2009 | Huber et al. | |
| 2009/0229173 A1 | 9/2009 | Gosling | |

(Continued)

FOREIGN PATENT DOCUMENTS

EP 0718392 9/1999
EP 1719811 11/2006

(Continued)

OTHER PUBLICATIONS

Hilten, et al "Comparison of Three Accelerated Aging Procedures to Assess Bio-Oil Stability" Fuel 89(2010), 2741-2749.

(Continued)

*Primary Examiner* — Pamela H Weiss
(74) *Attorney, Agent, or Firm* — Dunlap Codding, P.C.

(57) ABSTRACT

A process and system for separating a light fraction, a bio-distillate fraction, and a heavy fraction from a bio-oil, and for producing a renewable distillate including at least in part the bio-distillate fraction and a stabilizing additive, is provided. The process comprises separating bio-oil into light, bio-distillate, and heavy fractions based on their boiling points. At least a portion of the bio-distillate fraction and a stabilizing additive are blended with a petroleum-derived-diesel-range stream, without any prior hydrotreatment, to thereby provide a renewable distillate composition.

13 Claims, 1 Drawing Sheet

U.S. PATENT DOCUMENTS

| | | |
|---|---|---|
| 2009/0250376 A1 | 10/2009 | Brandvold et al. |
| 2009/0253947 A1* | 10/2009 | Brandvold et al. ............ 585/14 |
| 2009/0253948 A1 | 10/2009 | McCall et al. |
| 2009/0259082 A1 | 10/2009 | Deluga et al. |
| 2009/0294324 A1 | 12/2009 | Brandvold et al. |
| 2009/0301930 A1 | 12/2009 | Brandvold et al. |
| 2009/0318737 A1 | 12/2009 | Luebke |
| 2010/0212215 A1 | 8/2010 | Agblevor |

FOREIGN PATENT DOCUMENTS

| | | |
|---|---|---|
| EP | 2107100 | 10/2009 |
| WO | 2006037368 | 4/2006 |
| WO | 2007128798 | 11/2007 |
| WO | 2007128800 | 11/2007 |
| WO | 2009014859 | 1/2009 |
| WO | WO2009/071495 | 6/2009 |
| WO | 2009126508 | 10/2009 |
| WO | 2010002792 | 1/2010 |
| WO | 2010008686 | 1/2010 |
| WO | 2010033512 | 3/2010 |
| WO | WO2010/068809 | 6/2010 |
| WO | PCT/US2011/055411 | 3/2012 |

OTHER PUBLICATIONS

Ikura, et al "Emulsification of Pyrolysis Derived Bio-Oil in Diesel Fuel" Biomass & BioEnergy 24 (2003) 221-232.

Charamonti, et al "Development of Emulsions From Biomass Pyrolysis Liquid and Diesel and Their Use in Engines, Part 1; Emulsion Production" Biomass & BioEnergy 25 (2003) 85-99.

Qi, et al "Review of Biomass Pyrolysis Oil Properties and Upgrading Research", Energy Conversion & Management 48 (2007) 87-92.

Garcia-Perez, et al "Production and Fuel Properties of Fast Pyrolysis Oil/Bio-Diesel Blends" Fuel Processing Technology 91 (2010) 296-305.

Ringer, et al, "Large-Scale Pyrolysis Oil Production: A Technology Assessment and Economic Analysis" NREL Technical Report, NREL/TP-510-37779, Nov. 2006.

Czernik, et al "Stability of Wood Fast Pyrolysis Oil" Biomass and Bioenergy, vol. 7, Nos. 1-6, pp. 187-192, 1994, Great Britain.

Mahinpey, et al "Analysis of Bio-Oil, Biogas, and Biochar From Pressurized Pyrolysis of Wheat Straw Using a Tubular Reactor" Energy & Fuels 2009, 23 2736-2742.

Czernik, et al "Overview of Applications of Biomass Fast Pyrolysis Oil" Energy & Fuels 2004, 18, 590-598.

Oasmaa, et al, "Fast Pyrolysis of Forestry Residue. 3. Storage Stability of Liquid Fuel" Energy & Fuels 2003, 17, 1075-1084.

Diebold, "A Review of the Chemical and Physical Mechanisms of the Storage Stability of Fast Pyrolysis Bio-Oils" NREL/SR-570-27613, Jan. 2000.

Moens, et al. "Study of the Neutralization and Stabilization of a Mixed Hardwood Bio-Oil" Energy & Fuels 2009, 23, 2695-2699.

* cited by examiner

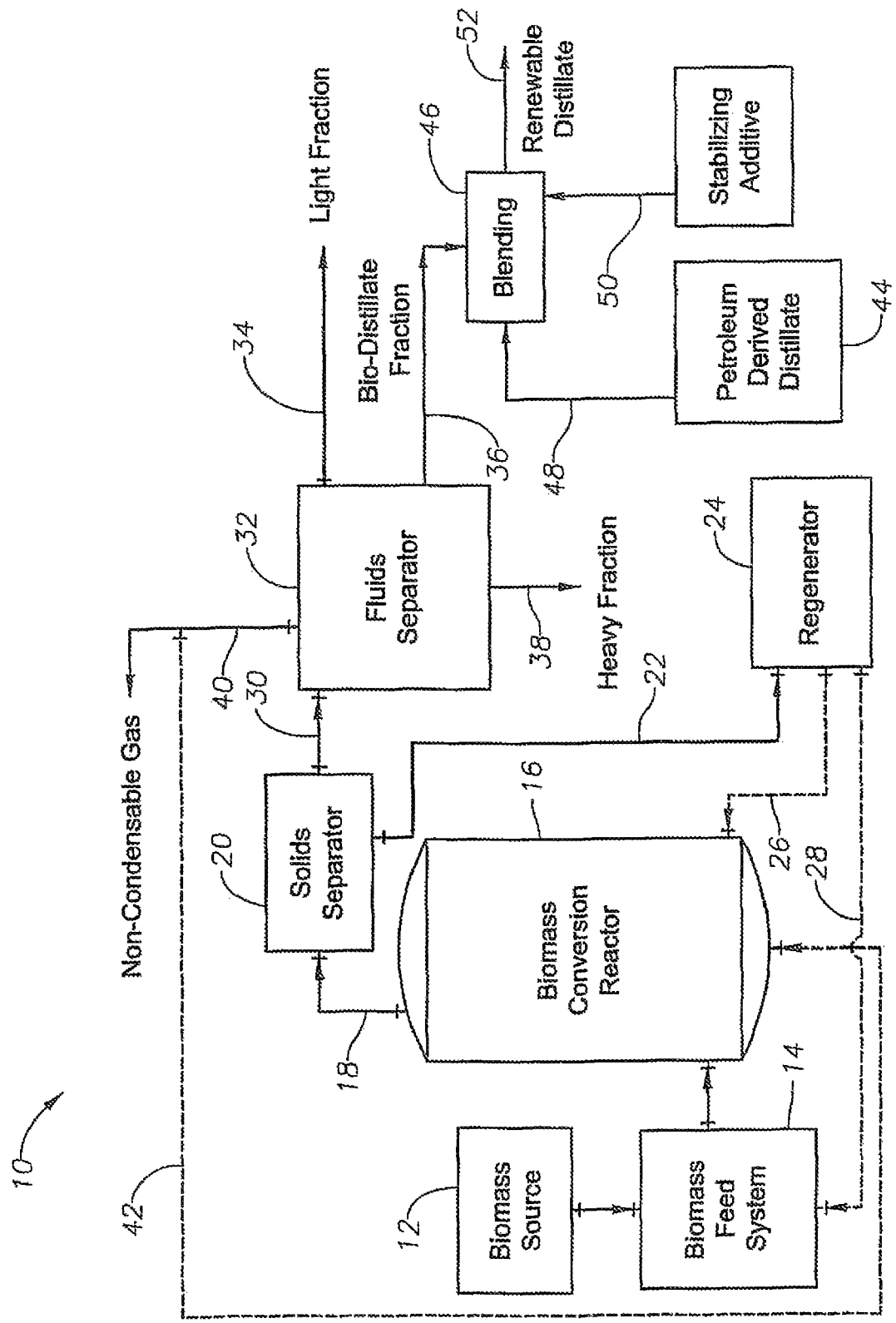

PRODUCTION OF RENEWABLE BIO-DISTILLATE

BACKGROUND

1. Field of the Invention

The present invention relates generally to processes and systems for separating a bio-distillate fraction from a bio-oil. More specifically, the invention relates to the production of a renewable distillate including at least in part the bio-distillate fraction.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen which are difficult, if not impossible, to separate into various fractions. These bio-oils require extensive secondary upgrading in order to be utilized as transportation fuels and/or as fuel additives due to the high amounts of oxygen present in the bio-oil. Furthermore, these transportation fuels and/or fuel additives derived from bio-oil vary in quality depending on the original oxygen content of the bio-oil.

Accordingly, there is a need for an improved process and system for separating bio-oil into various fractions such as bio-distillate, and using such fractions as blend components of renewable fuels.

SUMMARY OF THE INVENTION

In one embodiment, the present invention is directed to a bio-distillate fraction production process comprising (a) converting biomass in a conversion reactor containing a catalyst to thereby produce a conversion reactor effluent comprising vapor conversion products; (b) condensing at least portion of the vapor conversion products to thereby provide a bio-oil having a total oxygen content of less than about 15 weight percent; and (c) separating a bio-distillate fraction from the bio-oil, wherein at least about 75 weight percent of the bio-distillate fraction has a boiling point between about 180° C. and about 380° C., and wherein the bio-distillate fraction comprises at least about 50 or 40 weight percent oxygen-free hydrocarbons.

In another embodiment, the present invention is directed to a renewable distillate production process comprising: (a) separating a bio-oil into at least a bio-distillate fraction, wherein at least about 75 weight percent of the bio-distillate fraction has a boiling point between about 180° C. and about 380° C., wherein the bio-oil has not previously been subjected to an oxygen-removing hydrotreatment step; and (b) combining at least a portion of the bio-distillate fraction with a petroleum-derived-distillate-range stream, and a stabilizing additive having surfactant properties, to thereby produce a renewable distillate having a single clear phase, wherein the renewable distillate comprises the petroleum-derived-distillate-range stream in an amount of between about 5 weight percent and about 99 weight percent, the bio-distillate fraction in an amount of at least about 0.5 weight percent, and the stabilizing additive in an amount between about 0.5 and about 25 weight percent.

In a further embodiment, the present invention is directed to a bio-distillate fraction having a total oxygen content of less than about 15 weight percent, wherein at least about 75 weight percent of the bio-distillate fraction has a boiling point between about 180° C. and about 380° C., and the bio-distillate fraction comprises at least about 50 or 40 weight percent oxygen-free hydrocarbons.

In a further embodiment, the present invention is directed to a renewable distillate composition comprising a petroleum-derived-distillate-range stream in an amount of between about 5 weight percent and about 99 weight percent, a bio-distillate fraction in an amount of at least about 0.5 weight percent, and a stabilizing additive having surfactant properties in an amount between about 0.5 and about 25 weight percent.

BRIEF DESCRIPTION OF THE FIGURES

FIG. 1 is a schematic diagram of a biomass conversion system according to one embodiment of the present invention.

DETAILED DESCRIPTION

FIG. 1 depicts a biomass conversion system 10 that includes a means for separating bio-oil into various fractions or fuel additives and blending the bio-distillate fraction with a petroleum-derived-distillate-range stream, as a blend stock or fuel additive, to form renewable distillate.

It should be understood that the biomass conversion system shown in FIG. 1 is just one example of a system within which the present invention can be embodied. The present invention may find application in a wide variety of other systems where it is desirable to efficiently and effectively separate bio-oil into renewable fuels and/or fuel additives. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material.

The biomass feed system 14 introduces the biomass feedstock into a biomass conversion reactor 16. In the biomass conversion reactor 16, biomass is subjected to a conversion reaction that produces bio-oil. The biomass conversion reactor 16 can facilitate different chemical conversion reactions such as fast pyrolysis, slow pyrolysis, liquefaction, gasification, or enzymatic conversion. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be fast pyrolysis. More specifically, fast pyrolysis may include catalytic cracking. As used herein, "pyrolysis" refers to the thermochemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, non-condensable gases recycled from the biomass conversion process, and/or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In one embodiment of the present invention, the conversion reaction carried out in the biomass conversion reactor 16 produces a bio-oil. Such bio-oil can have an oxygen content that is less than 15, 12, 10, or 8 percent by weight of the bio-oil. The oxygen content can also be greater than about 0.5, 1, 3, or 5 percent by weight of the bio-oil.

When fast pyrolysis is carried out in the biomass conversion reactor 16, the conversion effluent 18 generally comprises solid particles of char, ash, and/or spent catalyst. The conversion effluent 18 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The substantially solids-free fluid stream 30, also referred to as bio-oil, exiting the solids separator 20 can then be introduced into a fluids separator 32. In one embodiment, it is preferred that the bio-oil 30 entering the fluids separator 32 has not previously been subjected to a deoxygenation process such as, for example, hydrotreating. The fluids separator 32 can be any system capable of separating the bio-oil 30 into at least a light fraction 34, a bio-distillate fraction 36, and a heavy fraction 38. Suitable systems to be used as the fluids separator 32 include, for example, systems for affecting separation by fractional distillation, heated distillation, extraction, membrane separation, partial condensation, and/or non-heated distillation. In some cases, it may be preferred to employ heated distillation to affect separation, where such heated distillation raises the temperature of the bio-oil 30 above 100° C. As shown in FIG. 1, non-condensable gases 40 may be removed from the fluids separator 32 and, optionally, recycled via line 42 to the biomass conversion reactor 16 for use as a lift gas.

The light fraction 34 exiting fluids separator 32 can have a boiling range comparable to petroleum-derived gasoline. The bio-distillate fraction 36 exiting fluids separator 32 can have a boiling range comparable to petroleum-derived distillates.

The boiling range of the bio-distillate fraction 36 can be such that at least 75, 85, 95, or 100 weight percent of the bio-distillate fraction 36 boils at a temperature between about 180° C. and about 380° C., between about 190° C. and about 370° C., or between about 205° C. and about 355° C. The boiling range of the heavy fraction 38 can be such that at least 75, 85, 95, or 100 weight percent of the heavy fraction 38 boils at a temperature greater than 380° C., 370° C. or 355° C. The boiling range of the light fraction 34 can be such that at least 75, 85, 95, or 100 weight percent of the light fraction 34 boils at a temperature less than about 205° C., 190° C., or 180° C.

In one embodiment, at least 5, 15, 25, or 35 weight percent of the bio-oil 30 entering the fluids separator 32 is separated into the bio-distillate fraction 36. In another embodiment at least 10, 20, or 30 weight percent of the bio-oil 30 entering the fluids separator 32 is separated into the light fraction 34, and less than 60 weight percent of the bio-oil 30 subjected to separation is separated into the heavy fraction 38.

Bio-Distillate Fraction/Composition

The bio-distillate fraction 36 can have an oxygen content that is less than 15, 12, 10, 8 and/or greater than about 0.5, 1, or 4 weight percent. The bio-distillate fraction, which can also be referred to as a bio-distillate composition, can comprise at least about 40 or 50 weight percent oxygen-free hydrocarbons, and can have less than about 1 or 0.5 weight percent carbonyls, and can have less than about 0.5 or 0.2 weight percent carboxylic acid.

The bio-distillate fraction can have less than about 0.5 or less than about 0.2 weight percent aldehydes, and can further comprise between about 10 and about 40, or between about 20 and about 40 weight percent oxygen-and-carbon-containing compounds. The oxygen-and-carbon-containing compounds can be selected from the group consisting of phenolics, furans, ketones, aldehydes, and mixtures thereof.

The bio-distillate fraction/composition preferably has a copper corrosion test value of less than No. 3.

Renewable Distillate

As illustrated in FIG. 1, biomass production system 10 can be located near or connected by a transportation system with a petroleum-derived distillate source 44. Petroleum-derived distillate source 44 can be, for example, a petroleum refinery, a petroleum fuel storage facility, and/or a petroleum fuel transportation system.

A distillate blending system 46 can be used to combine a petroleum-derived distillate-range stream 48, which can have between 12 and 25 carbon atoms per molecule, from petroleum-derived distillate source 44 with at least a portion of the bio-distillate fraction 36 and a stabilizing additive 50 to thereby produce a renewable distillate composition 52 having a single clear phase.

The renewable distillate composition can comprise the petroleum-derived-distillate-range stream 48 in an amount of at least 5, 15, or 25 weight percent and/or at most 99, 98, or 96 weight percent; the bio-distillate fraction 36 in an amount of at least 0.5, 2, 5, 25, or 60 weight percent, and the stabilizing additive having surfactant properties in an amount between about 0.5 and about 25 weight percent.

The stabilizing additive can comprise a material selected from the group consisting of: 1) a non-ionic block-copolymer having a Hydrophile-Lipophile Balance (HLB) of at most eight, seven, or six and/or at least two or three; 2) a non-ionic homopolymer having an HLB of at most eight, seven, or six and/or at least two or three, 3) a mixture of a non-ionic block-copolymer and a non-ionic homopolymer having an average HLB of at most eight, seven, or six and/or at least two or three; 4) a non-ionic surfactant having an HLB of at most eight, seven, or six and/or at least two or three, 5) a Fatty Acid Methyl Ester (FAME), or 6) a combination thereof. Examples of stabilizing additives include, but are not limited to, Hypermer series polymers, Brij series surfactants, Propylene Glycol Isostereate, Span series surfactants, Glycol Stearate, Sorbitan Sesquioleate, Glyceryl Stearate, Lecithin series surfactants, Sorbitan Oleate, Sorbitan Monostearate NF, Sorbitan Stearate, Sorbitan Iso stearate, Steareth-2, Oleth-2, Glyceryl Laurate, Ceteth-2, PEG series polymer surfactants, Dipolyhydroxystearate, Glyceryl Stearate SE, Methyl Glucose Sesquistearate, Atsurf series surfactants, and mixtures thereof.

Among other choices, the petroleum-derived-distillate-range stream can be selected from the group consisting of a regular distillate, low sulfur distillate, hydroprocessed light cycle oil, hydrotreated straight run gas oil, ultra low sulfur distillate, refinery processed middle distillate, or mixtures thereof.

In cases wherein the stabilizing additive which is used comprises non-ionic surfactant, non-ionic block-copolymer, or non-ionic homopolymer, or a mixture of non-ionic block-copolymer and the non-ionic homopolymer; for ease of processing it is preferred to either simultaneously or sequentially add the stabilizing additive and the bio-distillate fraction to the petroleum-derived-distillate-range stream, thereby forming the renewable distillate.

In cases wherein the stabilizing additive comprises a FAME; it has been discovered that a significant operational advantage is achieved by combining the bio-distillate fraction with the stabilizing additive prior to combination of the two components with the petroleum-derived-distillate-range stream, thereby forming the renewable distillate.

EXAMPLES

Example 1

A low oxygen bio-oil was produced from the conversion of southern yellow pine wood particles by pyrolysis in the presence of a catalyst in a riser reactor operated at a reactor outlet temperature of about 650° C. The resulting bio-oil had an oxygen content of about 12 weight percent, and was distilled to yield more than 25 weight percent of a bio-diesel fraction boiling in the range of less than about 345° C. The composition of the bio-distillate fraction is shown below in Table 1.

TABLE 1

|  | wt % in bio-distillate |
|---|---|
| Cyclics/Aromatics | |
| Cyclic dienes | 0.00 |
| BTEX | 0.46 |
| Other 1-Ring Aromatics | 0.12 |
| Indane/Indenes | 6.45 |
| Naphthalenes | 53.07 |
| 3-Ring | 2.60 |
| 4-Ring | 0.00 |
| 5-Ring | 0.00 |
| 6-Ring | 0.00 |
| Total | 62.70 |
| Nitrogen Compounds | |
| Indazoles | 0.00 |
| Oxygenates | |
| Alcohols | 0.00 |
| Ethers | 0.98 |
| Carboxylic Acids | 0.00 |
| Aldehydes | 0.00 |
| Ketones | 0.32 |
| Phenols | 7.96 |
| Diols | 7.72 |
| Indenols | 3.09 |
| BenzoFurans | 3.86 |
| Naphthols | 13.37 |
| Levoglucosan | 0.00 |
| Total | 37.30 |
| Total [O] (%) | 11.21 |

As can be seen from the data, the bio-distillate fraction is of high quality, having a low oxygen content, undetectable carboxylic acids, and significant amounts of cyclic/aromatics.

Example 2

A quantity of Hypermer B241 polymer was blended with commercially available Ultra Low Sulfur Diesel (ULSD) to form a first mixture, which was then combined with a quantity of the bio-distillate fraction from Example 1 to form a renewable distillate blend containing 97 weight percent ULSD, 1 weight percent Hypermer B241, and 2 weight percent bio-distillate. Following mixing using an ultra sonic homogenizer, the renewable distillate blend was a single clear phase.

Example 3

Different quantities of a FAME were blended with quantities of the bio-distillate fraction from Example 1 to form mixtures, which were then combined with quantities of ULSD to form renewable distillate blends which were mixed with an ultra sonic homogenizer. Single clear phases were obtained for all of the blends shown in Table 2 below.

TABLE 2

| Bio-Distillate, wt. % | FAME, wt. % | ULSD, wt. % |
|---|---|---|
| 0.5 | 0.5 | 99.0 |
| 1.0 | 1.0 | 98.0 |
| 1.5 | 1.5 | 97.0 |
| 2.0 | 2.0 | 96.0 |
| 2.5 | 2.5 | 95.0 |
| 18.8 | 6.2 | 75.0 |
| 12.5 | 12.5 | 75.0 |
| 20.0 | 5.0 | 75.0 |
| 21.2 | 3.8 | 75.0 |
| 25.0 | 25.0 | 50.0 |
| 37.5 | 12.5 | 50.0 |
| 40.0 | 10.0 | 50.0 |
| 42.5 | 7.5 | 50.0 |
| 45.0 | 5.0 | 50.0 |
| 47.5 | 2.5 | 50.0 |
| 60.0 | 15.0 | 25.0 |
| 63.7 | 11.3 | 25.0 |
| 67.5 | 7.5 | 25.0 |
| 71.2 | 3.8 | 25.0 |

Example 4

Quantities of the bio-distillate fraction from Example 1 were blended with ULSD to form a blend of 2% bio-distillate (BD), using 1 wt % Hypermer B246 polymer material, with an HLB of 6; and to form another blend of 40% bio-distillate (BD) using 2.5 wt % FAME acquired from the company Houston Biodiesel located in Houston, Tex. The ULSD and the various blends were tested for various properties/components. The results of such tests are reflected in Table 3 below. Table 3 also includes the specified values of those properties for two types of distillate petroleum products, diesel #2 S500 (D2 S500) and fuel oil #2 (F0#2). The resulting blends were observed to be clear and stable and the blends met the conventional distillate specifications.

TABLE 3

| Property | Test Method | D2 S500 Specs | ULSD | 2% BD | FO#2 Specs | 40% BD |
|---|---|---|---|---|---|---|
| Kinematic viscosity, mm$^2$/sec 40° C., | | | | | | |
| min | D445 | 1.9 | 2.70 | 2.53 | 1.9 | |
| max | | 4.1 | | | 3.4 | |
| Density, (kg/m$^3$ @15° C.), max | D1298 | | | | 876 | 922 |
| Ramsbottom carbon residue on 10% distillation residue, wt %, max | D524 | | | 0.14 | 0.15 | 0.17 |
| Flash Point, ° C., min | D93 | 52 | 60 | 65 | 38 | 71.6 |
| Pour Point, ° C., max | | | −27 | | −6 | −21 |
| Distillation, ° C., v % recovered, T90 | | | | | | |
| Min | D86 | 282 | 320 | 314 | 282 | 314 |
| Max | | 338 | | | 338 | |
| Water and Sediment, v %, max | D2709 | 0.05 | 0 | 0 | 0.05 | 0 |
| Ash wt %, max | D482 | 0.01 | | <10$^{-3}$ | | <10$^{-3}$ |
| Copper Strip Corrosion, max | D130 | No. 3 | | No. 1 | No. 3 | No. 1 |
| Sulfur, ppm | D97 | 500 | 0.05 | | 1000 | 25 |
| Cetane number: one of the following: | | | | | | |
| (A)   Cetane Index, min. OR | D613 | 40 | 44.5 | | | |
| (B)   (1) Cetane Index, min. | D 76 | 40 | 46.3 | 45 | | |
| (2) Aromaticity, % vol, max | D1319 | 35 | 28.2 | 25.2 | | 28.5 |
| Lubricity, HFRR @ 60° C., micron, max | D6079 | 520 | 260 | 260 | | |
| Conductivity, pS/m, max | D2624 | 25 | ~10$^{-4}$ | <1 | | |
| Other properties | | | | | | |
| Relative Density @ 60/60° F. | | | | | | 923 |
| PNA Aromatics | D1319 | | 28.2 | | | 28.5 |
| Olefins | | | 2.2 | | | 1.8 |
| Paraffins | | | 69.6 | | | 69.7 |

As can be seen from Table 3 above, the properties of the renewable distillate made by blending bio-distillate, Additive and ULSD fall within the specifications for distillate fuels. The renewable distillate containing 2 wt % biodiesel met specifications for Diesel #2-S500, while the renewable distillate containing 40% biodiesel met Fuel Oil #2 specifications (other than density and Ramsbottom carbon for the 40% BD blend).

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A bio-distillate composition having a total oxygen content of greater than about 0.5 weight percent and less than about 15 weight percent, wherein at least about 75 weight percent of said bio-distillate composition has a boiling point between about 180° C. and about 380° C., and said bio-distillate composition comprises greater than about 10 weight percent phenolics and at least about 50 weight percent oxygen-free hydrocarbons.

2. The bio-distillate composition of claim 1 wherein said bio-distillate composition has less than about 1 weight percent carbonyls, and has less than about 0.5 weight percent carboxylic acid.

3. The bio-distillate composition of claim 2 wherein said bio-distillate composition has less than about 0.5 weight percent aldehydes, and further comprises between about 10 and about 40 weight percent other oxygen-and-carbon-containing compounds, wherein said other oxygen-and-carbon-containing compounds are selected from the group consisting of phenolics, furans, and mixtures thereof.

4. The bio-distillate composition of claim 1 wherein said bio-distillate composition is derived from thermochemical conversion of lignocellulosic biomass.

5. The bio-distillate composition of claim 3 wherein said bio-distillate composition is derived from thermochemical conversion of a lignocellulosic biomass.

6. The bio-distillate composition of claim 1 wherein said bio-distillate composition has a total oxygen content greater than about 1 weight percent.

7. The bio-distillate composition of claim 1 wherein said bio-distillate composition has a total oxygen content greater than about 4 weight percent.

8. The bio-distillate composition of claim 1 wherein said bio-distillate composition has less than about 0.5 weight percent carbonyls, and has less than about 0.2 weight percent carboxylic acid.

9. The bio-distillate composition of claim 1 wherein at least about 90 weight percent of said bio-distillate composition has a boiling point between about 180° C. and about 380° C.

10. The bio-distillate composition of claim 1 wherein about 100 weight percent of said bio-distillate composition has a boiling point between about 180° C. and about 380° C.

11. The bio-distillate composition of claim 1 wherein at least about 75 weight percent of said bio-distillate composition has a boiling point between about 190° C. and about 370° C.

12. The bio-distillate composition of claim 1 wherein at least about 75 weight percent of said bio-distillate composition has a boiling point between about 205° C. and about 355° C.

13. The bio-distillate composition of claim 2 wherein said bio-distillate composition has less than about 0.5 weight percent aldehydes, and further comprises between about 20 and about 40 weight percent other oxygen-and-carbon-containing compounds, wherein said other oxygen-and-carbon-containing compounds are selected from the group consisting of phenolics, furans, and mixtures thereof.

* * * * *